3,332,995
α-OXO-SULFURYLENE-CARBONAMIDES

Horst Metzger and Horst Koenig, Ludwigshafen (Rhine), Germany, assignors to Badische Anilin- & Soda-Fabrik Aktiengesellschaft, Ludwigshafen (Rhine), Germany
No Drawing. Filed Mar. 27, 1964, Ser. No. 355,463
Claims priority, application Germany, Apr. 3, 1963, B 71,404
10 Claims. (Cl. 260—558)

This invention relates to a process for the production of compounds containing sulfur and nitrogen.

It is an object of this invention to provide a process for the production of sulfur-containing acetamides and malonamides. Another object of the invention is the provision of new and valuable sulfur-containing acetamides and malonamides.

We have found that compounds containing sulfur and nitrogen and having the general formula:

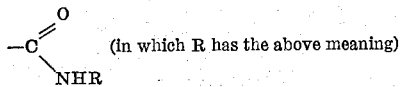

in which R denotes an unsubstituted or halogen-substituted alkyl, aryl, aralkyl or cycloalkyl radical, $R_1$ denotes an alkyl radical, $R_2$ denotes an alkyl radical and R' denotes a hydrogen atom or a carbonamide group having the formula

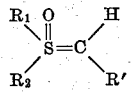

(in which R has the above meaning)

are obtained by reacting an isocyanate having the formula:

$$R-N=C=O$$

in which R has the above meaning, or a substance which will form such an isocyanate under the reaction conditions, with an oxosulfoniumylidene having the general formula:

in which $R_1$, $R_2$ and R' have the above meaning, if desired in the presence of an inert solvent, at a temperature of from —10° to 100° C.

In the isocyanates having the general formula:

$$R-N=C=O$$

to be used as initial materials, the radical R may denote the phenyl radical, an alkaryl radical having from seven to ten carbon atoms, an aralkyl radical having from seven to ten carbon atoms, a cycloalkyl radical having from five to eight carbon atoms or an alkyl radical having from one to seven carbon atoms. The radical R may bear one or two halogen atoms, such as chlorine atoms or bromine atoms, as substituents.

For example phenyl isocyanate, p-tolyl isocyanate, benzyl isocyanate, methyl isocyanate, ethyl isocyanate, isopropyl isocyanate, n-butyl isocyanate, n-octadecyl isocyanate, cyclohexyl isocyanate or cyclododecyl isocyanate may be used in particular. p-Chlorophenyl isocyanate, o-chlorophenyl isocyanate, 4-chloro-3-methylphenyl isocyanate, 2-methylcyclohexyl isocyanate or β-chloroethyl isocyanate, for example, may also be used as initial materials.

The equivalent carbamyl chlorides, such as are formed for example by reaction of a primary amine with phosgene, may also be used as initial materials instead of isocyanates. These amines are derived from compounds having the general formula $R—NH_2$ in which R has the above meaning.

Oxosulfoniumylidenes having the formula:

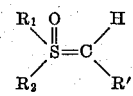

which are suitable for the process according to this invention are particularly dimethyl-oxo-sulfonium methylide:

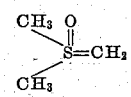

(readily accessible from trimethyl-oxo-sulfonium halides with strong bases, for example in the manner described in J. Am. Chem. Soc. 84, 867 (1962)) or dimethyl-oxo-sulfurylene acetamides having the formula:

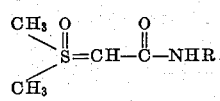

(obtainable readily for example by reaction of dimethyl-oxo-sulfonium methylide with an isocyanate having the formula $R—N=C=O$ in the molar ratio of advantageously 1:1).

Solvents used may be those which do not react with the reactants under the reaction conditions, for example ethers, hydrocarbons, chlorohydrocarbons, N,N-dialkyl-substituted amides or lower fatty acids, N-alkyllactams or dialkyl sulfoxides. It is preferred to use dimethyl sulfoxide. It is advantageous to exclude water, but slight traces of water are not troublesome, e.g. 0.1 to 1% by weight is not harmful. The reaction temperature may be between 0° C. and about 100° C.; it is advantageous to work at room temperature.

The final products depend on the initial materials used, the way in which they are added and the amounts of the reactants used. For example if an ylide having the formula:

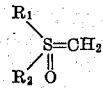

is allowed to flow into an isocyanate and care is taken that the molar ratio of ylide to isocyanate is not more than 0.5:1, two molecules of isocyanate react with one molecule of ylide with the formation of a substituted malonamide. On the other hand if an equivalent amount or an excess of isocyanate is slowly added to the ylide, a mixture of the mono- and di-addition products is formed. The optimum conditions for the production of 1:1 or 1:2 adducts differ somewhat in each case but may readily be ascertained by preliminary experiment. If an ylide having the formula:

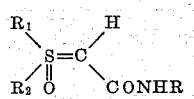

is used, a substituted malonamide is exclusively obtained. tained.

Working up is carried out either by removing the solvent or by stirring the reaction mixture into water and recrystallizing the residual or separated addition product, which is usually crystalline.

The substances obtainable by the process according to this invention are new. They constitute, optionally after removal of the radical:

for example by means of Raney nickel (Organic Reactions, 12, 356 (1962)), valuable intermediates for pharmaceuticals, dyes and pesticides. For example dyes which go on to cotton cloth are obtained by coupling dimethyl-oxo-sulfurylene acetamides with diazonium salts in aqueous suspension for example at 10° to 40° C.

The following examples will further illustrate this invention. Unless otherwise stated, parts are by weight. Parts by weight bear the same relation to parts by volume as the gram to the ccm. (S.T.P.)

Example 1

A solution of 44 parts of trimethyl-oxo-sulfonium iodide and 5.34 parts of 90% sodium hydride in 300 parts of dimethyl-sulfoxide is allowed to flow during thirty minutes in an atmosphere of nitrogen and with ice cooling into 36 parts of phenyl isocyanate in 100 parts of dimethylsulfoxide. The whole is further stirred for one hour and then poured onto ice. The colorless product is suction filtered and dried. 47 parts of dimethyl-oxo-sulfurylene malonic dianilide is obtained having a melting point of 174.5° to 175° C.

*Analysis.*—$C_{17}H_{18}N_2O_3S$ (molecular weight 330.4). Calculated: C, 61.8%; H, 5.5%; O, 14.5%; S, 9.7%; N, 8.5%. Found: C, 62.1%; H, 5.6%; O, 14.4%; S, 9.9%; N, 8.3%.

The structure:

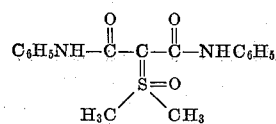

of the compound is confirmed by infrared and nuclear resonance spectroscopy.

By reductive desulfurization of this compound with pyrophoric Raney nickel in ethanol at 70° C., malonic dianilide having a melting point of 223° to 224° C. is obtained in a 98% yield; it is identical with the authentic material.

Example 2

2.67 parts of 90% sodium hydride is added at 20° C. to 22.0 parts of trimethyl-oxo-sulfonium iodide in 150 parts of dimethylsulfoxide. After disengagement of hydrogen has ceased, 11.90 parts of phenyl isocyanate is dripped in during thirty minutes. The resultant clear solution is stirred into ice-waer and the precipitate is suction filtered and dried. 5.40 parts of dimethyl-oxo-sulfurylene-malonic dianilide is separated therefrom by extraction with benzene. 10.65 parts (51% of the theory) of dimethyl-oxo-sulfurylene-acetanilide remains; it is recrystallized from ethanol and then melts at 178° to 179° C. with decomposition.

*Analysis.*—$C_{10}H_{13}NO_2S$ (molecular weight 211.3). Calculated: C, 56.8%; H, 6.2%; N, 6.6%; O, 15.1%; S, 15.2%. Found: C, 56.9%; H, 6.4%; N, 6.9%; O, 15.0%; S, 15.3%.

Infrared and nuclear resonance spectra and also the reaction according to Example 3 support the structure:

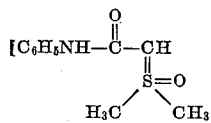

By desulfurization as described in Example 1, an almost quantitative yield of acetanilide is obtained (melting point 114° C.) which is identical with an authentic sample.

If p-chlorophenyl isocyanate be used instead of phenyl isocyanate, under otherwise identical reaction conditions dimethyl-oxo-sulfurylene - p - chloroacetanilide (melting point 183° to 185° C.) is obtained which can be converted by desulfurization with Raney nickel into p-chloroacetanilide (melting point 176° to 178° C.) which is identical with authentic material.

Example 3

When 2.11 parts of dimethyl-oxo-sulfurylene-acetanilide is dissolved in 20 parts of dimethylsulfoxide and allowed to stand for twenty-four hours at 20° C. with 1.19 parts of phenyl isocyanate and then poured onto ice, 3.0 parts of dimethyl-oxo-sulfurylene-malonic dianilide is obtained which has a melting point of 174° to 175° C. and is identical with the substance obtained in Example 1. Dimethylformamide or N-methylpyrrolidone may be used as solvent instead of dimethylsulfoxide.

Example 4

By using 1.25 parts of cyclohexyl isocyanate instead of phenyl isocyanate in Example 3, 3.12 parts of dimethyl-oxo - sulfurylene - malonic - N - phenyl - N' - cyclohexyl-diamide is obtained. A sample which has been recrystallized from carbon tetrachloride melts at 163° C.

*Analysis.*—$C_{17}H_{24}N_2O_3S$ (molecular weight 336.4). Calculated: C, 60.7%; H, 7.2%; N, 8.3%; O, 14.3%; S, 9.5%. Found: C, 60.9%; H, 7.0%; N, 8.6%; O, 14.1%; S, 9.2%.

Nuclear resonance and infrared spectra confirm the structure:

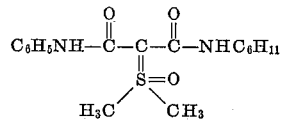

Example 5

25.0 parts of cyclohexyl isocyanate is added to an ylide solution, prepared as in Example 2, during thirty minutes at 38° C. and thirty minutes later the whole is poured into ice-water. By suction filtration 30.6 parts of dimethyl-oxo-sulfurylene-malonic acid-N,N'-dicyclohexyl-amide:

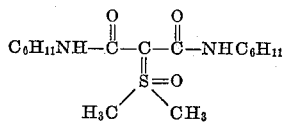

is obtained.

A sample after recrystallization from ethanol melts at 216.5° C.

*Analysis.*—$C_{17}H_{30}N_2O_3S$ (molecular weight 308). Calculated: C, 59.6%; H, 8.8%; N, 8.2%; O, 14.0%; S, 9.4%. Found: C, 59.6%; H, 9.0%; N, 7.9%; O, 14.7%; S, 9.7%.

The structural formula is supported by infrared and nuclear resonance spectra.

Example 6

39.6 parts of n-butyl isocyanate is added slowly at 20° C. to an ylide solution which has been prepared as described in Example 2 and the product is worked up as described in Example 4. 38.5 parts of dimethyl-oxo-sulfurylene-malonic acid-N,N'-butyldiamide having the formula:

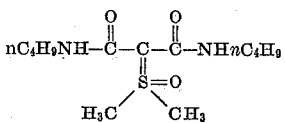

is obtained. A sample which has been recrystallized from cyclohexane has a melting point between 116° and 118° C.

*Analysis.*—C₁₃H₂₆N₂O₃S. Calculated: C, 53.8%; H, 9.0% O, 16.5%; N, 9.7%; S, 11.0%. Found: C, 53.6%; H, 9.1%; O, 16.5%; N, 9.5%; S, 11.1%.

The product obtained by catalytic desulfurization is identical with a molonic acid-N,N'-butyldiamide which has been synthesized independently.

Example 7

A suspension of 22.0 parts of trimethyl-oxo-sulfonium iodide and 8.0 parts of sodium hydride in 500 parts of tetrahydrofuran is heated for one hour at 70° C. and then 24.3 parts is isopropylcarbamyl chloride is added at 50° C. The whole is heated for two hours at 50° C., the solvent removed at 12 mm. Hg and 21.8 parts of dimethyl-oxo-sulfurylene-malonic acid-N,N'- isopropyldiamide having the formula:

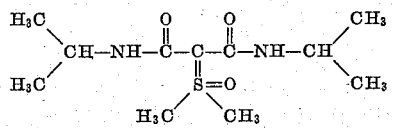

is recovered by extracting the residue with ethanol. The melting point is 213.5° to 214° C.

*Analysis.*—C₁₁H₂₄N₂O₃S. Calculated: C, 50.4%; H, 8.5%; N, 10.7%, O, 18.3/; S, 12.2%. Found: C, 50.6%, H, 8.5%; N, 10.5%; O, 18.0%; S, 12.3%.

The structure is confirmed by infrared and nuclear resonance spectra and also by desulfurization to malonic acid N,N'-isopropyl-diamide.

The same result is achieved by reacting a mixture of 40 parts of isopropyl isocyanate and 60 parts of isopropylcarbamyl chloride with a solution of dimethyl-oxo-suffonium methylide in dimethylsulfoxide and pouring the reaction mixture into water.

Example 8

44 parts of trimethyl-oxo-sulfonium iodide, dissolved in 400 parts by volume of dimethylsulfoxide, is stirred at 20° C. with 5.34 parts of 90% sodium hydride until disengagement of water ceases. 10.01 parts of tertiary-butyl isocyanate is then added slowly, the whole stirred for fifteen minutes and the reaction mixture poured onto ice. The whole is shaken up with chloroform, dried over sodium sulfate, concentrated and the crude product thus obtained is washed with ethylacetate. After recrystallization from chloroform, 5.75 parts of dimethyl-oxo-sulfurylene-N-tertiary-butylacetamide is obtained (equivalent to 30% of the theory with reference to tritertiary-butyl isocyanate used) in the form of colorless crystals having a decomposition point of 195° C.

*Analysis.*—C₈H₁₇NO₂S (molecular weight 191.3). Calculated: C, 50.2%; H, 9.0%; O, 16.7%; N, 7.3%; S, 16.8%. Found: C, 50.5%; H, 9.0%; O, 16.5%; N, 7.0%; S, 16.8%.

From spectroscope data, the structure is:

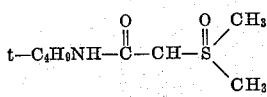

Example 9

The procedure of Example 8 is used but using 12.52 parts of cyclohexyl isocyanate instead of 10.01 parts of tertiarybutyl isocyanate and crystallizing the crude product from ethanol. 11.95 parts of dimethyl-oxo-sulfurylene-N-cyclohexylacetamide is thus obtained, equivalent to 55% of the theory with reference to cyclohexyl isocyanate used, in the form of colorless crystals having a decomposition point of 178° C.

*Analysis.*—C₁₀H₁₉O₂NS (molecular weight 217.3). Calculated: C, 53.3%; H, 8.8%; O, 14.7%; N, 6.5% S, 14.8%. Found: C, 55.7%; H, 9.0%; O. 14.4%; N, 6.3%; S, 14.6%.

The following structure results from spectroscopic data:

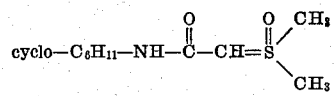

Example 10

14.71 parts of β-phenylethyl isocyanate is used instead of 10.01 parts of tertiary-butyl isocyanate in the procedure of Example 8. The product is recrystallized from ethanol and 12.45 parts of dimethyl-oxo-sulfurylene-N-β-phenylethylacetamide is obtained as colorless crystals having a decomposition point of 149° C. The yield is equivalent to 52% of the theory with reference to the β-phenylethyl isocyanate used.

*Analysis.*—C₁₂H₁₇O₂NS (molecular weight 239.3). Calculated: C, 60.4%; H, 7.2%; O. 13.4%; N, 5.9% S, 13.4%. Found: C. 60.7%; H, 7.3%; O, 13.6%; N, 5.7%; S, 13.1%.

From analysis and spectroscopic data, the following structure results:

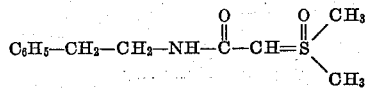

Example 11

22 parts of trimethyl-oxo-sulfonium iodide is dissolved in 200 parts by volume of dimethylsulfoxide and stirred with 2.67 parts of sodium hydride until disengagement of gas has ceased. 20.03 parts of tertiary-butyl isocyanate is added, the whole is stirred for thirty minutes and the reaction mixture then poured onto ice. The deposited crude product is suction filtered and recrystallized from methanol. 14.52 parts of dimethyl-oxo-sulfurylene-malonic acid-N,N'-tertiary-butyldiamide is obtained (corresponding to a yield of 50% of the theory with reference to the trimethyl-oxo-sulfonium iodide used) in the form of colorless crystals having a decomposition point of 221° C.

*Analysis.*—C₁₃H₂₆N₂O₃S (molecular weight 290.4). Calculated: C, 53.8%; H, 9.0%; N, 9.7%; O, 16.5%; S, 11.0%. Found: C, 53.7%; H, 9.2%; N, 9.4%; O, 16.8%; S, 11.0%.

Infrared and nuclear resonance spectra give the following structure:

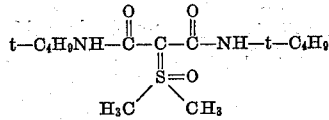

Example 12

The procedure of Example 11 is followed but 21.1 parts of β-chloroethyl isocyanate is used instead of tertiary-butyl isocyanate, and the crude product is recrystallized from ethanol. 15.75 parts of dimethyl-oxo-sulfurylene-malonic acid-N,N'- (β-chloroethyl-diamide is obtained (corresponding to 52% of the theory with reference to trimethyl-oxo-sulfonium iodide used). The colorless crystals melt at 131° C.

*Analysis.*—C₉H₁₆O₃N₂SCl₂ (molecular weight 302.2). Calculated: C, 35.8%; H, 5.3%; O, 15.9%; N, 9.3%; S, 10.6%; Cl, 23.4%. Found: C, 36.0%; H, 5.4%; O, 15.9%; N, 9.1%; S, 10.6%; Cl, 23.1%.

The following structure results from spectroscopic data:

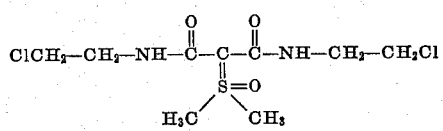

Example 13

Example 11 is repeated with the exception that 29.43 parts of β-phenylethyl isocyanate is used instead of tertiary-butyl isocyanate. After the crude product has been recrystallized from methanol, 23.20 parts of dimethyl-oxo - sulfurylene - malonic acid - N,N'-(β-phenylethyl)-diamide is obtained in the form of colorless crystals having a melting point of 128° C. The yield is therefore 60% of the theory with reference to trimethyl-oxo-sulfonium iodide used.

*Analysis.*—$C_{21}H_{26}N_2O_3S$ (molecular weight 386.5). Calculated: C, 65.4%; H, 6.8%; O, 12.4%; N, 7.2%; S, 8.3%. Found: C, 65.7%; H, 6.7%; O, 12.5%; N, 6.9%; S, 8.3%.

The structure is proved by spectroscopic data to be:

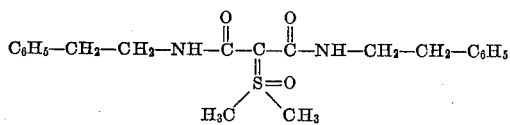

We claim:

1. A compound having the formula

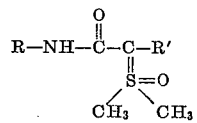

wherein R denotes a member selected from the group consisting of alkyl of 1 to 7 carbon atoms, chloro-substituted alkyl of 1 to 7 carbon atoms, phenyl, phenyl substituted by chlorine, alkaryl of 7 to 10 carbon atoms, aralkyl of 7 to 10 carbon atoms and cycloalkyl having 5 to 8 carbon atoms, R' denotes a member selected from the group consisting of hydrogen and the carbonamide group having the formula

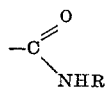

(in which R has the meaning given above).

2. Dimethyl-oxo-sulfurylene-malonic acid dianilide.
3. Dimethyl-oxo-sulfurylene-acetanilide.
4. Dimethyl-oxo-sulfurylene-p-chloroacetanilide.
5. Dimethyl-oxo-sulfurylene-malonic acid-N-phenyl-N'-cyclohexyl diamide.
6. Dimethyl-oxo-sulfurylene-malonic acid - N,N'-(β-chloroethyl)-diamide.

7. A process for the production of a compound containing sulfur and nitrogen and having the formula

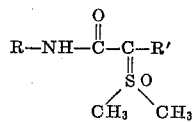

wherein R denotes a member selected from the group consisting of alkyl of 1 to 7 carbon atoms, chloro-substituted alkyl of 1 to 7 carbon atoms, phenyl, phenyl substituted by chlorine, alkaryl of 7 to 10 carbon atoms, aralkyl of 7 to 10 carbon atoms and cycloalkyl having 5 to 8 carbon atoms, R' denotes a member selected from the group consisting of hydrogen and the carbonamide group having the formula

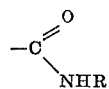

(in which R has the meaning given above), which comprises reacting an isocyanate having the formula

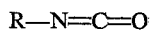

wherein R has the meaning given above, with an oxo-sulfoniumylidene having the formula

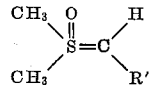

wherein R' has the meaning given above at a temperature of from −10° to +100° C.

8. A process as claimed in claim 7 carried out in the presence of an inert solvent.

9. A process as claimed in claim 8 wherein said inert solvent is an organic compound selected from the class consisting of ethers, hydrocarbons, chlorohydrocarbons, N,N-dialkylamides, lower fatty acids, N-alkyllactams and dialkyl sulfoxides.

10. A process as claimed in claim 8 wherein said inert solvent is dimethyl sulfoxide.

References Cited

Corey et al.: Jour. Amer. Chem. Soc., vol. 84, pp. 867–8 (1962).

WALTER A. MODANCE, *Primary Examiner.*

NATALIE TROUSOF, *Assistant Examiner.*

UNITED STATES PATENT OFFICE
CERTIFICATE OF CORRECTION

Patent No. 3,332,995                      July 25, 1967

Horst Metzger et al.

It is hereby certified that error appears in the above numbered patent requiring correction and that the said Letters Patent should read as corrected below.

Column 2, line 67, strike out "tained."; column 3, lines 67 to 71, at the beginning of the formula, strike out the opening bracket; column 5, line 5, for "molonic" read -- malonic --; column 6, line 59, for "($\beta$-chloroethyl-diamide" read -- ($\beta$-chloroethyl)-diamide --.

Signed and sealed this 25th day of June 1968.

(SEAL)
Attest:

Edward M. Fletcher, Jr.                      EDWARD J. BRENNER
Attesting Officer                            Commissioner of Patents